(12) United States Patent
Vereecken et al.

(10) Patent No.: US 10,115,961 B2
(45) Date of Patent: Oct. 30, 2018

(54) METHOD FOR THE FABRICATION OF A THIN-FILM SOLID-STATE BATTERY WITH $Ni(OH)_2$ ELECTRODE, BATTERY CELL, AND BATTERY

(71) Applicants: IMEC VZW, Leuven (BE); Katholieke Universiteit Leuven, KU LEUVEN R&D, Leuven (BE); Panasonic Corporation, Osaka (JP)

(72) Inventors: Philippe Vereecken, Liege (BE); Stanislaw Zankowski, Leuven (BE); Nathalie Hendrickx, Wilsele (BE); Maarten Mees, Kessel-Lo (BE); Mitsuhiro Murata, Osaka (JP); Haruhiko Habuta, Osaka (JP)

(73) Assignees: IMEC VZW, Leuven (BE); Katholieke Universiteit Leuven, KU LEUVEN R&D, Leuven (BE); Panasonic Corporation, Osaka (JP)

( * ) Notice: Subject to any disclaimer, the term of this patent is extended or adjusted under 35 U.S.C. 154(b) by 117 days.

(21) Appl. No.: 15/448,001

(22) Filed: Mar. 2, 2017

(65) Prior Publication Data

US 2017/0271649 A1 Sep. 21, 2017

(30) Foreign Application Priority Data

Mar. 21, 2016 (EP) .................................... 16161335

(51) Int. Cl.
*H01M 4/04* (2006.01)
*H01M 4/36* (2006.01)
(Continued)

(52) U.S. Cl.
CPC ....... *H01M 4/0445* (2013.01); *H01M 4/0452* (2013.01); *H01M 4/364* (2013.01);
(Continued)

(58) Field of Classification Search
CPC .... H01M 4/0445; H01M 10/38; H01M 10/30; H01M 10/36; H01M 4/52; H01M 4/48
See application file for complete search history.

(56) References Cited

U.S. PATENT DOCUMENTS

2006/0201801 A1* 9/2006 Bartlett ............... H01M 4/0438
204/284
2016/0379764 A1* 12/2016 Tour ....................... H01G 11/30
429/223

* cited by examiner

*Primary Examiner* — Stewart A Fraser
(74) *Attorney, Agent, or Firm* — McDonnell Boehnen Hulbert & Berghoff LLP (57) ABSTRACT

The disclosure relates to a method for the fabrication of a thin-film solid-state battery with $Ni(OH)_2$ electrode, battery cell, and battery. One example embodiment is a method for fabricating a thin-film solid-state battery cell on a substrate comprising a first current collector layer. The method includes depositing above the first current collector layer a first electrode layer. The first electrode layer is a nanoporous composite layer that includes a plurality of pores having pore walls. The first electrode layer includes a mixture of a dielectric material and an active electrode material. The method also includes depositing above the first electrode layer a porous dielectric layer. The method further includes depositing directly on the porous dielectric layer a second electrode layer. Depositing the second electrode layer includes depositing a porous $Ni(OH)_2$ layer using an electrochemical deposition process.

20 Claims, 6 Drawing Sheets

(51) Int. Cl.
*H01M 4/52* (2010.01)
*H01M 4/48* (2010.01)
*H01M 10/36* (2010.01)
*H01M 10/26* (2006.01)
*H01M 10/30* (2006.01)
*H01M 10/38* (2006.01)

(52) U.S. Cl.
CPC ............... *H01M 4/48* (2013.01); *H01M 4/52* (2013.01); *H01M 10/26* (2013.01); *H01M 10/30* (2013.01); *H01M 10/36* (2013.01); *H01M 10/38* (2013.01); *H01M 2300/0002* (2013.01)

METHOD FOR THE FABRICATION OF A THIN-FILM SOLID-STATE BATTERY WITH Ni(OH)$_2$ ELECTRODE, BATTERY CELL, AND BATTERY

CROSS-REFERENCE TO RELATED APPLICATIONS

The present application is a non-provisional patent application claiming priority to European Patent Application No. EP 16161335.1, filed Mar. 21, 2016, the contents of which are hereby incorporated by reference.

FIELD OF THE DISCLOSURE

The present disclosure relates to a method for the fabrication of thin-film solid-state battery cell with a Ni(OH)$_2$ electrode, to a thin-film solid-state battery cell comprising a Ni(OH)$_2$ electrode, and to a battery comprising the cell.

BACKGROUND

Solid-state nickel-metal hydride (NiMH) type batteries may comprise a nanoporous composite layer of silica and titania as a negative electrode (anode), wherein the titania functions as the active electrode material. The composite electrode layer comprises TiO$_x$ nanoparticles that are embedded or dispersed in a porous silica (SiO$_x$) structure. The operation principle of such a battery relies on the presence of an adsorbed water layer on the pore walls or pore surfaces of the nanoporous silica structure. The water layer provides both (a) water as a reagent in the charging and discharging reactions at the anode and cathode and (b) the means for ionic conduction (the electrolyte). As a positive electrode (cathode), a NiO layer has been proposed. The NiO layer may for example be provided by Physical Vapor Deposition. The positive electrode and the negative electrode may be separated by a thin layer of nanoporous dielectric material such as silica which also contains adsorbed water on its pore walls and acts as a solid electrolyte.

However, using NiO as a positive electrode material in such a device structure may have some disadvantages. For example, when using NiO there is a net consumption of water in the charging reaction (i.e. during battery charging). This may dry out the adsorbed surface water layer that is used for battery operation. Further, the reaction of water or hydroxyl ions with the NiO electrode is limited to a relatively thin surface layer of the NiO electrode, because water and hydroxyl ions cannot easily penetrate into the bulk of the NiO layer. In order to increase the electrode reaction rate (current) an electrode with a higher effective surface area than a planar electrode may be used. As such, a porous NiO structure may be more efficient as it allows better access of water.

As an alternative to "dry" NiO, "wet" Ni(OH)$_2$ may be used as a positive electrode material in conventional wet nickel-metal hydride type batteries with an alkaline electrolyte. In some embodiments, Ni(OH)$_2$ may be used in a water-based solid-state nickel-metal hydride type battery as described above, because when using such electrode there is no net consumption of water during charging/discharging and it is an intrinsically hydrated material allowing also access of water to the bulk of the material. In conventional alkaline-based NiMH and alkaline Zn batteries, Ni(OH)$_2$ is typically applied from powders. However, due to the relatively large particle size of the powders (for example in the order of 10 micrometer) such process is not suitable for forming an electrode layer of a thin-film battery, wherein the electrode layer typically has a thickness in the order of 1 micrometer. Apart from particle-based processes, electrodeposition of Ni(OH)$_2$ may be used for the formation of nanoporous Ni(OH)$_2$ layers, but these electrodeposition processes are not suitable for deposition of Ni(OH)$_2$ layers as an electrode layer of a battery type as described above, having an operation principle relying on the presence of an adsorbed water layer on the pore walls or pore surfaces of a nanoporous silica structure.

SUMMARY

The present disclosure may provide a method for fabricating thin-film solid-state battery cells having a Ni based positive electrode and to provide thin-film solid-state batteries having a Ni based positive electrode, wherein the batteries have a high energy density.

The present disclosure may provide a method for fabricating thin-film solid-state battery cells and thin-film solid-state batteries having a Ni based positive electrode, wherein the risk of drying out is avoided or strongly reduced as compared to alternative water-based batteries.

The above features are at least partially accomplished by a method and device according to the present disclosure.

According to a first aspect, the disclosure is related to a method for fabricating a thin-film solid-state battery cell.

A method for fabricating a thin-film solid-state battery cell on a substrate comprising a first current collector layer is provided, the method comprising: depositing above the first current collector layer a first electrode layer, wherein the first electrode layer is a nanoporous composite layer comprising a plurality of pores having pore walls, and wherein the first electrode layer comprises a mixture of a dielectric material and an active electrode material; depositing above the first electrode layer a porous dielectric layer; and depositing directly on the porous dielectric layer a second electrode layer, characterized in that depositing the second electrode layer comprises depositing a porous Ni(OH)$_2$ layer using an electrochemical deposition process.

Some embodiments of the method of the present disclosure enable the fabrication of a thin-film solid-state battery cell wherein, during charging and discharging, consumption of water is counteracted, such that drying out of the battery cell is counteracted.

Some embodiments of the method of the present disclosure promote allow an adhesion between the second electrode layer and the underlying dielectric layer, and thus a contact between the second electrode layer and the solid electrolyte, which is beneficial for the battery operation and performance.

In some embodiments of the method of the present disclosure, the porosity of the second electrode layer and its thickness can be controlled by selecting the electrochemical deposition conditions used in the process of forming the second electrode layer, such as for example the current or voltage used during deposition and the composition of the solution used for the deposition.

Some embodiments of the method of the present disclosure enable the fabrication of a thin-film solid-state battery cell wherein the charging and discharging reactions (which occur by interaction with water and hydroxyl ions) can occur throughout a major portion of the Ni(OH)$_2$ positive electrode layer and that these reactions are not limited to a (surface) portion of the second electrode layer. This allows reaching a higher energy density and a higher effective battery capacity as compared to alternative approaches.

Depositing the second electrode layer "directly" on the porous dielectric layer means within the context of the present disclosure depositing the second electrode layer in physical contact with the porous dielectric layer, i.e. without any other layers, structures or similar in between.

Some embodiments of the method of the present disclosure enable deposition of a $Ni(OH)_2$ layer directly on an electrically non-conductive surface, thus enabling deposition of the $Ni(OH)_2$ layer directly on the porous dielectric layer. Some embodiments of the present disclosure enable the fabrication of a battery cell wherein the $Ni(OH)_2$ layer (second electrode layer) is provided after having provided the first electrode layer and the porous dielectric layer. Forming the first electrode layer and the porous dielectric layer may include a baking step, typically at a temperature in the order of 500° C. Therefore, if the $Ni(OH)_2$ layer (second electrode layer) would instead be provided before forming the porous dielectric layer and the first electrode layer, such baking steps would substantially increase the risk of drying out of the $Ni(OH)_2$ layer during such formation steps. Some embodiments of the method of the present disclosure provide a fabrication process for a thin-film battery cell wherein the number of process steps, after having provided the $Ni(OH)_2$ layer, at an elevated temperature increasing the risk of drying out of the $Ni(OH)_2$ layer may be strongly reduced.

It should be noted that within the context of the present disclosure the term "nanoporous composite" may be any type of composite material having pores with a pore size (e.g. pore diameter) in the range between 0.4 nm and 20 nm.

It should be noted that within the context of the present disclosure the term "electrochemical deposition process" may be any process based on a chemical precipitation reaction induced at an electrode surface by an electrochemical reaction that locally changes the pH, wherein the pH change induces precipitation.

The method may be arranged to fabricate a thin-film solid-state battery wherein the first electrode layer may form a negative electrode layer and the second electrode layer may form a positive electrode layer.

In embodiments of the present disclosure, the method may further comprise, after the step of depositing the first electrode layer, hydrophilizing the pore walls of the first electrode layer, which may create pore walls having a hydrophilic surface, thereby facilitating the adsorption of a water layer on the pore wall surfaces. Such a water layer may be used to enable ionic conduction within the first electrode layer and for enabling an exchange of electrons at the first electrode layer during charging and discharging of a battery cell comprising such a first electrode layer.

In embodiments of the present disclosure, hydrophilizing the pore walls may comprise performing an UV curing step, i.e. exposing the first electrode layer to UV light, which is advantageous in that it is a step that can be performed at ambient temperature, not requiring, for example, heating In embodiments of the present disclosure, hydrophilizing the pore walls may comprise performing an annealing step in a humid atmosphere, which may include an annealing step in an ambient containing water or water vapor, such that it may result in the adsorption of a water layer on the pore wall surfaces, as used to enable high ionic conduction within the first electrode layer and for enabling an exchange of electrons at the first electrode layer during charging and discharging of a battery cell comprising such a first electrode layer. The annealing may for example be performed at a temperature in the range between 400° C. and 550° C., for 1 to 3 hours, in an environment comprising $H_2$ and $O_2$, the present disclosure not being limited thereto. It should be noted that within the context of the present disclosure the term "humid atmosphere" may be any atmosphere having a relative humidity exceeding 30%, e.g. exceeding 40%.

In embodiments of the present disclosure, depositing the porous $Ni(OH)_2$ layer using an electrochemical deposition process may comprise depositing by an electro-precipitation process. In embodiments of the present disclosure the porous $Ni(OH)_2$ layer may for example have a porosity in the range between 40% and 60% and a thickness in the range between 100 nm and 10 micrometer, for example between 100 nm and 5 micrometer, for example between 200 nm and 2.5 micrometer, the present disclosure not being limited thereto.

In embodiments of the present disclosure, the electrochemical deposition process may comprise a first phase comprising charging of the first electrode layer, thereby making it electrically conductive, and a second phase comprising $Ni(OH)_2$ precipitation on the porous dielectric layer. During the first phase of the electrochemical process there may be no $Ni(OH)_2$ material deposition yet. Charging of the first electrode layer may be done by providing electrical energy to the electrode layer, for example by applying an electrical potential or an electrical current as is done during the electrochemical deposition process.

In embodiments of the present disclosure, the mixture of dielectric material and active electrode material of the first electrode layer may comprise a dielectric material matrix with active electrode material particles dispersed therein. The particles may be nanoparticles. In such embodiments the first electrode layer may for example have a porosity in the range between 20% and 60%, for example between 20% and 40%, and the active electrode material particles may have a diameter less than 5 nm, the present disclosure not being limited thereto.

In embodiments of the present disclosure, the mixture of dielectric material and active electrode material of the first electrode layer may be a mixture of dielectric material nanoparticles and active electrode material nanoparticles. In such embodiments the first electrode layer may for example have a porosity in the range between 40% and 60%, the dielectric material nanoparticles may for example have a diameter in the range between 10 nm and 100 nm and the active electrode material nanoparticles may for example have a diameter in the range between 5 nm and 20 nm, the present disclosure not being limited thereto.

In embodiments of the present disclosure, a negative electrode layer may for example be a silica-titania layer comprising a silica dielectric material and a titania active electrode material, the present disclosure not being limited thereto. The thickness of the negative electrode layer may for example be in the range between 500 nm and 10 micrometer, for example between 1 micrometer and 10 micrometer, the present disclosure not being limited thereto.

According to embodiments of the present disclosure the method may further comprise depositing a second current collector layer above the second electrode layer, which may enable the second current collector layer to have a high electrical conductivity, such that an electrical current may be efficiently carried in and out of the second electrode layer, with a low resistance related potential drop, when operating a battery cell fabricated according to an embodiment of the present disclosure.

The disclosure is according to a second aspect related to battery cells and batteries fabricated in accordance with the method of the present disclosure.

According to a second aspect, a thin-film solid-state battery cell is provided, the thin-film solid-state battery cell comprising: a first current collector layer; a first electrode layer above the first current collector layer, wherein the first electrode layer is a nanoporous composite layer comprising a plurality of pores having pore walls, and wherein the first electrode layer comprises a mixture of a dielectric material and an active electrode material; a porous dielectric layer above the first electrode layer; and a second electrode layer directly on the porous dielectric layer, characterized in that the second electrode layer is a thin-film porous $Ni(OH)_2$ layer.

In general, features of this aspect of the disclosure provide similar advantages as discussed above in relation to the previous aspect.

In embodiments of the present disclosure, the thickness of the thin-film porous $Ni(OH)_2$ layer may be in the range between 100 nm and 10 micrometers, which may enable integration of the layer in a thin-film battery cell, providing high volumetric energy density and power capability.

In embodiments of the present disclosure, the thin-film porous $Ni(OH)_2$ layer may have a porosity in the range between 40% and 60%, which may provide a large interface for electrochemical interaction, which may result in an increased interaction between an electrolyte and the electrode material during charging and discharging of a battery cell comprising such a porous electrode layer, leading to a battery cell with an improved charge capacity. In some embodiments, a porous electrode layer may have a larger plastic deformation window as compared to a non-porous electrode layer, such that it may have a better resistance to strain occurring during charging and discharging of a battery cell comprising such a porous electrode layer.

In embodiments of the present disclosure, the porous $Ni(OH)_2$ layer may for example have a porosity in the range between 40% and 60% and a thickness in the range between 100 nm and 10 micrometer, for example between 100 nm and 5 micrometer, for example between 200 nm and 2.5 micrometer, the present disclosure not being limited thereto.

In embodiments of the present disclosure, the mixture of dielectric material and active electrode material of the first electrode layer may comprise a dielectric material matrix with the active electrode material, e.g. active electrode material particles, dispersed therein. The particles may be nanoparticles.

In embodiments of the present disclosure, the first electrode layer may be a silica-titania nanoporous layer with a porosity in the range between 20% and 60%, which may provide a large interface for electrochemical interaction, which may result in an increased interaction between an electrolyte and the electrode material during charging and discharging of a battery cell comprising such a porous electrode layer, leading to a battery cell with an improved charge capacity. A porous electrode layer may have a larger plastic deformation window as compared to a non-porous electrode layer, such that it may have a better resistance to strain occurring during charging and discharging of a battery cell comprising such a porous electrode layer.

In such embodiments, the first electrode layer may for example have a porosity in the range between 20% and 60%, for example between 20% and 40%, and the active electrode material particles may have a diameter less than 5 nm, the present disclosure not being limited thereto.

In embodiments of the present disclosure, the mixture of dielectric material and active electrode material of the first electrode layer may be a mixture of dielectric material nanoparticles and active electrode material nanoparticles. In such embodiments the first electrode layer may for example have a porosity in the range between 40% and 60%, the dielectric material nanoparticles may for example have a diameter in the range between 10 nm and 100 nm and the active electrode material nanoparticles may for example have a diameter in the range between 5 nm and 20 nm, the present disclosure not being limited thereto.

In embodiments of the present disclosure, the negative electrode layer may for example be a silica-titania layer comprising a silica dielectric material and a titania active electrode material, the present disclosure not being limited thereto. The thickness of the negative electrode layer may for example be in the range between 500 nm and 10 micrometer, for example between 1 micrometer and 10 micrometer, the present disclosure not being limited thereto.

In embodiments of the present disclosure, the porous dielectric layer may be a porous silica layer having a porosity in the range between 10% and 90%, which may provide a large inner surface for adsorption of a water layer acting as an electrolyte layer and thus for improved ion conduction through the porous dielectric layer between the first electrode and the second electrode when charging or discharging a battery cell comprising such dielectric layer. A porous layer may have a larger plastic deformation window as compared to a non-porous layer, such that it may have a better resistance to strain occurring during charging and discharging of a battery cell comprising such a porous layer.

In embodiments of the present disclosure, the porous dielectric layer may for example be a porous silica layer, the present disclosure not being limited thereto. The porous dielectric layer may for example have a thickness in the range between 5 nm and 500 nm, for example between 10 nm and 100 nm, the present disclosure not being limited thereto. The porous dielectric layer may for example have a pore size in the range between 1 nm and 20 nm, such as for example in the order of 10 nm, the present disclosure not being limited thereto. The porosity may for example be in the range between 10% and 90%, e.g. between 20% and 60%, for example between 30% and 40%.

In embodiments of the present disclosure, the mixture of dielectric material and active electrode material of the first electrode layer may comprise a dielectric material matrix with active electrode material nanoparticles dispersed therein, which may provide a large surface area, which may result in a battery cell having fast charging characteristics.

A thin-film solid-state battery according to embodiments of the present disclosure comprises at least one thin-film solid-state battery cell as described above. The battery may comprise a plurality, e.g. at least two, of such thin-film solid-state battery cells, wherein the plurality of battery cells may be connected in series or in parallel or a combination of both.

In some embodiments of the battery cell and the battery according to the present disclosure, during charging and discharging, the net consumption of water is counteracted, such that drying out of the battery cell or battery may be avoided.

In some embodiments of the battery cell and of the battery according to the present disclosure, the charging and discharging reactions (which occur by interaction with water and hydroxyl ions) can occur throughout a major portion of the $Ni(OH)_2$ positive electrode layer and that these reactions are not limited to a (surface) portion of the positive electrode layer. This allows reaching a higher energy density and a higher effective battery capacity as compared to alternate approaches.

Particular aspects of the disclosure are set out in the accompanying independent and dependent claims. Features from the dependent claims may be combined with features of the independent claims and with features of other dependent claims as appropriate and not merely as explicitly set out in the claims.

The above and other characteristics and features of the present disclosure will become apparent from the following detailed description, taken in conjunction with the accompanying drawings, which illustrate, by way of example, the principles of the disclosure. This description is given for the sake of example only, without limiting the scope of the disclosure. The reference figures quoted below refer to the attached drawings.

In the different figures, the same reference signs refer to the same or analogous elements.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

It is to be noticed that the term "comprising", used in the claims, should not be interpreted as being restricted to the elements listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of example embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

The following terms are provided solely to aid in the understanding of the disclosure.

In a rechargeable battery, each of the electrodes has a first polarity during the discharge (i.e. battery operation) and a second, opposite polarity during charging. Technically speaking however, the negative electrode is the anode during the discharge and the cathode during charging. Vice versa, the positive electrode is the cathode during discharge and the anode when charging the battery. In the context of the present disclosure, the terminology of the discharge (i.e. battery operation) is used. Herein further, with anode the negative electrode is meant and with cathode the positive electrode is meant. Through the disclosure, when referred to "anode material" it is meant the negative electrode material and when referred to "cathode material" it is meant the positive electrode material.

In the context of the present disclosure, a battery half-cell is a structure comprising a single electrode layer and an electrolyte layer, for example an anode layer and an electrolyte layer or a cathode layer and an electrolyte layer. In the context of the present disclosure, a battery cell is a structure comprising two electrode layers with an electrolyte layer in between, i.e. a structure comprising an anode layer/electrolyte layer/cathode layer stack. A battery may comprise a single battery cell or it may comprise a plurality of, e.g. at least two, battery cells. A battery may comprise two or more battery cells connected in series or in parallel, or a combination of series and parallel connected battery cells.

In the context of the present disclosure, an active electrode material is a material that is a component of a battery electrode layer. In the active electrode material the actual electrochemical transformation (change in valence) takes place, which gives rise to storage of chemical energy in the electrode. An electrode layer is typically composed of the active electrode material and supporting material.

In the context of the present disclosure, a water-based battery is a battery wherein water is involved in the electrochemical reaction of the active electrode material. Water-based batteries usually have a water-based electrolyte.

In the context of the present disclosure, a thin film is a thin layer or thin coating having a thickness in the range between 10 nm and 10 micrometer. A thin-film battery is a battery composed of thin-film layers, i.e. a battery wherein the cathode layer, the electrolyte layer and the anode layer are thin layers with a thickness in the range between 10 nm and 10 micrometer.

In the context of the present disclosure, a nanoporous film or nanoporous layer is a material layer having pores with a pore size (e.g. pore diameter) in the range between 0.4 nm and 20 nm.

In the context of the present disclosure, nanoparticles are particles having a diameter in the range between 1 nm and 500 nm, typically between 10 nm and 100 nm. The nanoparticles can for example have a particular shape such as a spherical, cubic, octahedral or coned shaped, or they can have a random shape.

The disclosure will now be described by a detailed description of several embodiments of the disclosure. It is clear that other embodiments of the disclosure can be configured according to the knowledge of persons skilled in the art without departing from the true spirit or technical teaching of the disclosure, the disclosure being limited only by the terms of the appended claims.

Figure 1:
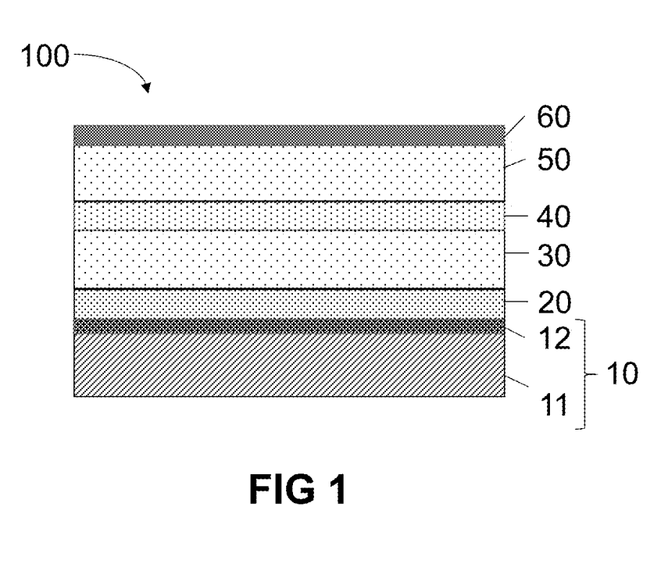
FIG. 1 schematically shows a cross section of an example of a thin-film solid-state battery cell, according to example embodiments.

FIG. 1 schematically shows a cross section of a thin-film solid-state battery cell 100 according to an embodiment of the present disclosure. The battery cell 100 comprises an anode layer or negative electrode layer (first electrode layer) 30 on a substrate 10, and optionally an electron injection layer 20 between the substrate 10 and the negative electrode layer 30. In the example shown in FIG. 1, the substrate 10 comprises a carrier substrate 11 and a negative current collector layer (first current collector layer) 12 on top of the carrier substrate 11. As shown in FIG. 1, the substrate 10 may comprise multiple layers. For example, the substrate 10 may comprise a silicon carrier 11 and a negative collector layer 12, e.g. a TiN negative collector layer. The battery cell 100 further comprises a cathode layer or positive electrode layer (second electrode layer) 50, with a solid electrolyte layer 40 sandwiched between the negative electrode layer 30 and the positive electrode layer 50. On top of the positive electrode layer 50 a positive current collector layer (second current collector layer) 60, e.g. a metal contact layer, is present. Optionally the battery cell 100 may comprise additional layers, such as for example a buffer layer (not shown in FIG. 1) between the negative electrode layer 30 and the solid electrolyte layer 40, such as for example a PECVD silicon nitride buffer layer.

In embodiments of the present disclosure, the substrate 10 comprises a (negative) current collector layer 12, and the negative electrode layer 30 (and the optional electron injection layer 20) is provided on the negative current collector layer 12. The substrate 10 may for example consist of a stack of different layers, e.g. comprising a current collector layer 12 provided on a silicon carrier substrate or on a foil such as a flexible foil. The current collector layer 12 may for example comprise Ti, TiN, carbon, Pt, Ni, Al, stainless steel or carbon nanotubes, or combinations thereof, the present disclosure not being limited thereto. The thickness of the current collector layer 12 may for example be in the range between 10 nm and 250 nm, the present disclosure not being limited thereto. The current collector layer 12 may consist of a single layer or it may be a multilayer stack, such as for example a two-layer stack comprising a TiN layer and a Ni layer coated on the TiN layer, or for example comprising a Ti layer and a TiN layer on top of the Ti layer. In embodiments of the present disclosure the carrier substrate may also have the function of a current collector layer.

The carrier substrate 11 may be planar or it may be non-planar. For example, a non-planar carrier substrate 11 may comprise a plurality of 3D features or 3D microstructures, such as for example a plurality of micro-pillars. For example, the carrier substrate may comprise an array of high aspect-ratio pillars, such as for example silicon pillars, and the silicon pillars may be coated with a current collector layer 12. The pillars may for example have a diameter in the range between 0.5 micrometer and 10 micrometer, a spacing of 1 micrometer to 20 micrometer and a height in the range between 10 micrometer and 200 micrometer, the present disclosure not being limited thereto. A substrate comprising a plurality of 3D microstructures may result in an increased battery capacity.

The optional electron injection layer 20 may also act as an adhesion layer or as a wetting layer for the negative electrode layer 30. The electron injection layer 20 may for example be a thin titanium oxide layer (e.g. having at thickness in the range between 1 nm and 10 nm), the present disclosure not being limited thereto.

The depicted negative electrode layer 30 is a nanoporous composite layer comprising a mixture of a dielectric material and active electrode material, e.g. active electrode material particles. In embodiments of the present disclosure the layer 30 may comprise a dielectric material matrix with active electrode material particles dispersed in the dielectric matrix. It may for example be a silica-titania nanoporous composite layer, e.g. comprising $TiO_x$ amorphous nanoparticles embedded in a (porous) silica ($SiO_x$) matrix. The active electrode material nanoparticles may for example have a diameter smaller than 5 nm and within the composite negative electrode layer 30 the distance between neighboring nanoparticles may be less than 5 nm. The porosity of the porous matrix may for example be in the range between 20% and 60%, for example in the range between 20% and 40%, such as for example in the order of 30%. In other embodiments of the present disclosure the nanoporous composite electrode layer 30 may comprise a mixture of dielectric material nanoparticles, such as for example silica, alumina or zirconia nanoparticles, and active electrode material particles, such as for example $TiO_x$ nanoparticles. The dielectric material nanoparticles may for example have a diameter in the range between 10 nm and 100 nm, for example between 10 nm and 30 nm, such as for example in the order of 20 nm, the present disclosure not being limited thereto. The active material nanoparticles may for example have a diameter in the range between 5 nm and 20 nm, the present disclosure not being limited thereto. The porosity of such composite electrode layer may for example be in the range between 40% and 60%. As an alternative to $TiO_x$ amorphous nanoparticles, other semiconductive metal oxides or hydroxides may be used that are electrochemically active at negative electrode potentials versus $Ni(OH)_2$, such as for example oxides containing Ta, Sn, Zn, Cu, Ge, W, Mo, V, or Nb, the present disclosure not being limited thereto. The thickness of the negative electrode layer 30 may for example be in the range of 500 nm to 10 micrometer, e.g. in the range between 1 micrometer and 10 micrometer, the present disclosure not being limited thereto. In embodiments wherein the negative electrode layer 30 comprises a dielectric porous matrix with embedded active electrode material nanoparticles, it may for example be provided by spin coating, blade coating, slot-die coating, spray coating or casting a liquid precursor, e.g. a sol-gel precursor, and curing. In embodiments wherein the negative electrode layer 30 comprises a mixture of dielectric nanoparticles and active electrode material particles it may be provided for example by blade coating, bar coating, spray coating, screen printing, ink jet printing or paste casting.

In embodiments of the present disclosure, the positive electrode layer 50 is a "wet" $Ni(OH)_2$ layer or a $NiO.H_2O$ layer that is provided using electro-precipitation, on top of the solid electrolyte layer 40 and the negative electrode layer 30. The positive electrode layer 50 is a porous layer, typically having a porosity in the range between 40% and 60%. It may for example have a thickness in the range between 100 nm and 10 micrometer, for example between 100 nm and 5 micrometer, for example between 200 nm and 2.5 micrometer, the present disclosure not being limited thereto.

In embodiments of the present disclosure, the depicted solid electrolyte layer 40 is a hydrophilic porous dielectric layer such as for example a porous silica layer, with a thickness for example in the range between 5 nm and 500 nm, e.g. between 10 nm and 100 nm, the porous layer, e.g. porous silica layer having a plurality of pores with water being adsorbed on the inner surfaces or walls of the plurality of pores (after battery charging). The porous dielectric layer may for example have a pore size in the range between 1 nm and 20 nm, such as for example in the order of 10 nm, the present disclosure not being limited thereto. The porosity may for example be in the range between 10% and 90%, e.g. between 20% and 60%, for example between 30% and 40%. The solid electrolyte layer 40 is a composite electrolyte layer, comprising a porous matrix, e.g. porous silica matrix, with a water layer being adsorbed on the pore walls, the adsorbed water layer acting as the electrolyte. In embodiments of the present disclosure, the solid electrolyte layer 40 may be a single layer or it may be a layer stack. For example, the solid electrolyte layer 40 may be a layer stack comprising a thin layer (thickness e.g. 5 nm to 10 nm) of PVD or CVD silicon oxide and a solution processed porous silica layer on top of it. The porous silica layer may for example be formed by spin coating using a silicone precursor or a TEOS (TetraEthylOrthoSilicate) precursor. Providing a PVD or CVD silicon oxide layer may prevent penetration of the liquid precursor into the pores of the underlying negative electrode layer 30.

In embodiments of the present disclosure, the positive current collector (metal contact layer) 60 may for example comprise Ni, W, Ti, Au, Pt or a combination thereof, the present disclosure not being limited thereto.

Layer 40, which is part of a battery cell in accordance with embodiments of the present disclosure, is a porous and hydrophilic layer that can act as an electrolyte based on the presence of an adsorbed water layer on the pore walls. Such layer 40 can also be used as an electrolyte by filling the pores using a solution to create an electrolyte membrane. Therefore, layer 40 may also be used for forming proton and hydroxyl conducting membranes such as e.g. Nafion™ used in, for example, fuel cells, electrolyzers and solar-fuel cells. Solar-fuel cells are photo-electrochemical cells that produce chemicals (e.g. $H_2$ gas or methanol) from air (water vapor or $CO_2$) by photo-electrochemical conversion from solar light and use a (photo)cathode and a (photo)anode next to an electrolyte membrane.

The operation of a device according to embodiments of the present disclosure relies on moisture/water being present in the nanoporous negative electrode layer 30 and in the solid electrolyte layer 40, more in particular on moisture/water being adsorbed on the walls or inner surfaces of the pores present in the negative electrode layer 30 and in the solid electrolyte layer 40. In the battery, this moisture or water acts as a reagent for electron exchange at the electrodes during charging/discharging and as an ionic conductor (electrolyte layer). As compared to alternate approaches wherein a dry (e.g. sputtered) NiO layer is used as a positive electrode layer, embodiments of the present disclosure, wherein a $Ni(OH)_2$ layer is used as a positive electrode layer 50, may prevent net consumption of $H_2O$ in the total cathode and anode cell reaction, as further explained below. Therefore, as opposed to alternate methods wherein a dry NiO layer is used as a positive electrode layer, the risk of "drying out" of the surface water layer is avoided or substantially reduced.

In case of a dry NiO positive electrode layer, the charging/discharging cell reactions can be written as:

$$-(2TiO_2+H_2O+2e^- \leftrightarrow Ti_2O_3+2OH^-) \tag{1}$$

at the negative electrode, and $$2(NiOOH+e^- \leftrightarrow NiO+OH^-) \tag{2}$$

at the positive electrode.

The total charging/discharging cell reaction in case of a NiO positive electrode layer can then be written as:

$$2NiOOH+Ti_2O_3 \leftrightarrow 2NiO+2TiO_2+H_2O \tag{3}$$

This illustrates that during charging of the battery there is a consumption of $H_2O$ at the negative electrode, which is not compensated for at the positive electrode. This results in a net consumption of $H_2O$ during battery charging. As the water may also be used to provide an electrolyte function, a dry NiO positive electrode layer may be used in this battery.

In case of a "wet" $Ni(OH)_2$ positive electrode layer, the charging/discharging cell reactions can be written as:

$$-(2TiO_2+H_2O+2e^- \leftrightarrow Ti_2O_3+2OH^-) \tag{4}$$

at the negative electrode 30, and at the positive electrode 50.

The total charging/discharging cell reaction in case of a Ni(OH)$_2$ positive electrode layer can then be written as:

This illustrates, that when a Ni(OH)$_2$ positive electrode is used, H$_2$O is created from the Ni(OH)$_2$ during charging of the battery, according to reaction (5). This compensates for the consumption of H$_2$O at the negative electrode according to (4). The reverse reactions occur during discharging. Hence there is no net consumption of water during charging/discharging. This means that the surface water layer may remain unaffected and thus its electrolyte function may be maintained. Therefore, a "wet" Ni(OH)$_2$ positive electrode layer may be used in this battery.

Some embodiments of the present disclosure, wherein a Ni(OH)$_2$ layer is used as a positive electrode layer 50, include a reaction with water and hydroxyl ions that occurs throughout the entire Ni(OH)$_2$ electrode layer (i.e. over the total thickness of the electrode layer). In alternate approaches wherein a dry (e.g. sputtered) NiO layer is used as a positive electrode layer, the reaction is limited to a surface portion of the electrode layer because of the kinetically limited OH$^-$ diffusion through the "dry" NiO layer, resulting in access of only a surface portion of the NiO layer during charging and formation of a NiOOH layer only in the surface portion, i.e. at the NiO/electrolyte interface. In case of a Ni(OH)$_2$ electrode layer, OH$^-$ diffusion occurs through a "wet" (water containing) Ni(OH)$_2$ layer, and a NiOOH layer is formed first at the interface between the Ni(OH)$_2$ layer and the current collector layer (e.g. Ni layer) and then the NiOOH layer is further formed (further extends) though the entire Ni(OH)$_2$ layer. This is schematically illustrated in FIG. 2.

Figures 2A, 2B:
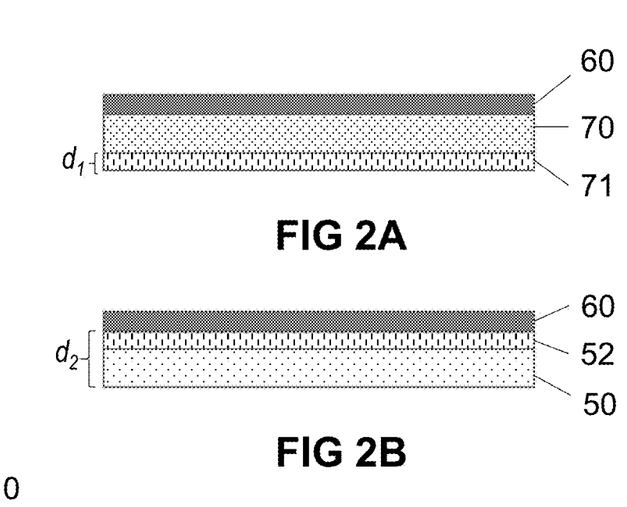
FIG. 2A schematically illustrates OH⁻ diffusion in the case of a "dry" NiO layer, according to example embodiments.
FIG. 2B schematically illustrates OH⁻ diffusion in the case of a "wet" Ni(OH)$_2$ layer, according to example embodiments.
Figure 2C:
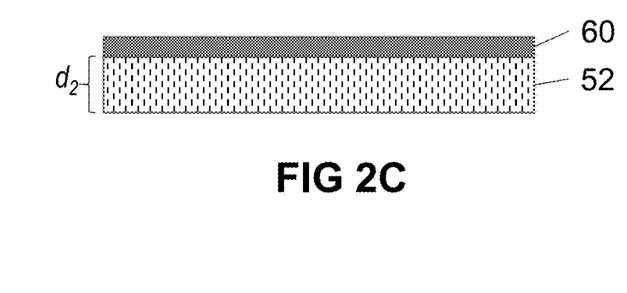
FIG. 2C schematically illustrates OH⁻ diffusion in the case of a "wet" Ni(OH)$_2$ layer, according to example embodiments.

FIG. 2A schematically shows a cross section of a layer stack comprising a metal layer 60, such as e.g. a Ni layer, and a "dry" NiO electrode layer 70 (e.g. a sputtered NiO layer). The NiO layer 70 does not contain bulk water, but water is only available near the exposed surface of the NiO layer 70 (or in a battery structure: at the interface with the solid electrolyte layer). As a result, only a surface portion 71 with thickness d$_1$ of the electrode layer 70 is accessible to water. Therefore, in such a structure, the electrochemical reaction with water may only occur in a surface portion 71 with thickness d$_1$ of the (substantially non-porous) NiO layer, this surface portion 71 being converted to NiOOH during the charging reaction (NiO+OH$^-$→NiOOH+e$-$). OH$^-$ diffusion through the "dry" NiO layer 70 is kinetically limited. Formation of NiOOH may occur at the exposed surface of the NiO layer 70, because the ionic resistance through the dry NiO layer is higher than the electronic resistance. For example, based on experiments with a 300 nm thick NiO layer 70, the thickness d$_1$ of the surface portion 71 was estimated to be in the order of 40 nm. This limits the NiO charging capacity and therefore the energy density and capacity of the battery.

FIG. 2B schematically shows a cross section of a layer stack comprising a metal layer 60, such as e.g. a Ni layer, and a Ni(OH)$_2$ electrode layer 50 containing water, i.e. a Ni(OH)$_2$.H$_2$O layer. First a portion 52 of the water containing Ni(OH)$_2$ electrode layer 50 at the interface with the metal layer 60 is converted into a water containing NiOOH layer (i.e. the Ni(OH)$_2$.H$_2$O layer 50 is converted to NiOOH.H$_2$O) during charging. In such a structure, the electrochemical reaction with water (Ni(OH)$_2$+OH$^-$→NiOOH+H$_2$O+e−) may occur not only in a portion 52 at the interface between the metal layer 60 and the electrode layer 50 but throughout the entire thickness d$_2$ of the Ni(OH)$_2$ electrode layer, as schematically illustrated in FIG. 2C. This is related to a relatively fast OH$^-$ diffusion through a water containing Ni(OH)$_2$ (or Ni(OH)$_2$.H$_2$O) layer. Formation of NiOOH starts at the Ni/Ni(OH)$_2$ interface as the electronic resistance of Ni(OH)$_2$ is larger than its resistance for ionic diffusion.

For example, half-cell measurements performed on a structure comprising a Ni(OH)$_2$ electrode layer (provided on a TiN/Ni collector layer) in a solution of 0.2M LiOH have shown that a Ni(OH)$_2$ electrode layer 50 fabricated by electrochemical precipitation has a much higher capacity than the a dry NiO electrode layer 70 of similar thickness. The measured capacity for both direct sputtered and reactive sputtered 300 nm thick dry NiO electrode layers was about 2 micro-Ah/cm$^2$. For a 320 nm thick Ni(OH)$_2$ electrode layer with 30% porosity a capacity of 20 micro-Ah/cm$^2$ (about 600 mAh/cm$^3$) was measured. Therefore, using a Ni(OH)$_2$ layer as a positive electrode layer may result in an increased charge capacity.

Figure 3:
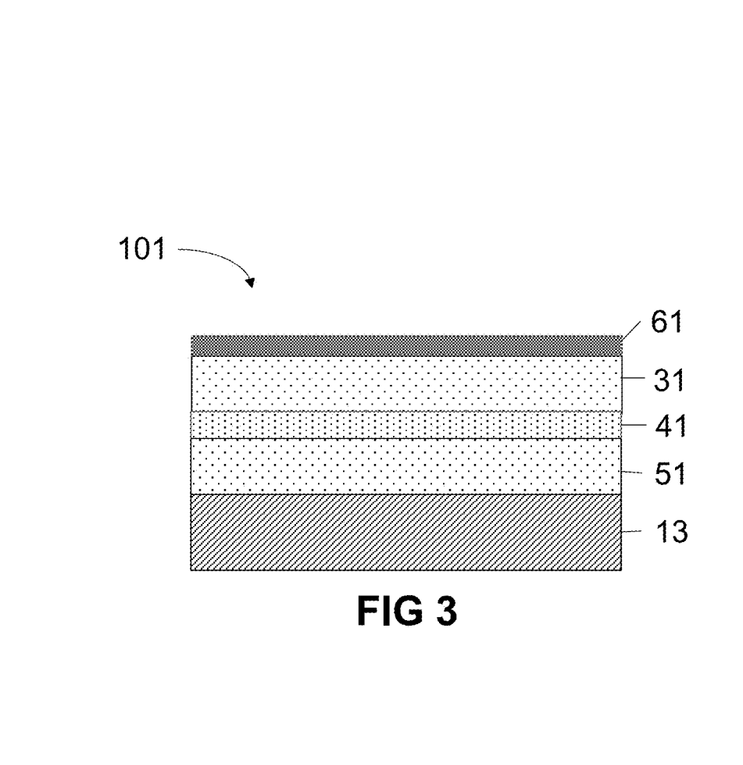
FIG. 3 schematically illustrates a cross section of an example of a thin-film solid-state battery that has an inverse layer stack as compared to the battery structure shown in FIG. 1, according to example embodiments.

When fabricating a solid-state battery comprising a Ni(OH)$_2$ electrode layer, the post deposition temperature budget (i.e. the temperature budget related to process steps done at an elevated temperature after deposition of the wet Ni(OH)$_2$ layer) may affect the quality of the wet electrode layer and thus the battery performance, and it may lead to structural changes. For example, starting at a temperature in the range between 80° C. and 110° C., surface water is removed. At higher temperatures, e.g. starting at 160° C. to 240° C., water incorporated in the electrode layer is removed, and at temperatures higher than 170° C. to 230° C. decomposition of Ni(OH)$_2$ to NiO is observed. This may for example be the case when fabricating a solid-state battery 101 comprising a Ni(OH)$_2$ electrode 51, wherein the battery 101 is based on a layer stack as schematically illustrated in FIG. 3, which corresponds to an inverse of the layer stack shown in FIG. 1. When fabricating a layer stack as illustrated in FIG. 3, a positive Ni(OH)$_2$ electrode layer 51 would be deposited on the substrate 13 (comprising a positive current collector), followed by deposition of a solid electrolyte layer 41 and a negative electrode layer 31 on the Ni(OH)$_2$ electrode layer 51, and finally a current collector layer 61. This fabrication process would involve a baking step, typically at a temperature in the order of 500° C., e.g. during formation of the negative electrode layer 31. There is a high risk that the 500° C. baking step results in drying out the Ni(OH)$_2$ layer 51 and decomposition to NiO. Therefore, in order to avoid these undesired effects, when fabricating a battery having a Ni(OH)$_2$ positive electrode layer, a fabrication process wherein the Ni(OH)$_2$ layer is deposited after having provided the negative electrode layer may be used. This corresponds to the layer stack (layer sequence) as shown in FIG. 1. In order to fabricate the layer stack shown in FIG. 1, there is a need for a method that allows depositing a wet thin-film Ni(OH)$_2$ layer 50 on top of an electrically insulating layer, in the example shown in FIG. 1: on the electrically insulating solid electrolyte layer 40 (porous silica layer) and the negative electrode layer 30.

The present disclosure provides a method for forming a wet Ni(OH)$_2$ layer 50 directly on top of the nanoporous dielectric layer (solid electrolyte layer 40) using electro-precipitation. Electro-precipitation, in accordance with embodiments of the present disclosure, may allow for controlling the porosity of the Ni(OH)$_2$ layer by controlling the deposition conditions (as for example further illustrated in FIG. 5), such as the current or voltage during deposition and the composition of the solution used for deposition. In some embodiments, the thickness can be controlled by controlling the charged passed during deposition. When used as a positive electrode layer 50 in a battery in accordance with the present disclosure, the Ni(OH)$_2$ layer may have a porosity in the range between 40% and 60% and a thickness in the range between 100 nm and 10 micrometer, for example between 100 nm and 5 micrometer, for example between 200 nm and 2.5 micrometer, the present disclosure not being limited thereto.

Surprisingly the electro-precipitation of a Ni(OH)$_2$ layer 50 directly on the nanoporous dielectric layer 40 (which is provided on top of a nanoporous composite negative electrode layer 30 on an electrically conductive current collector layer 12) succeeded. As the dielectric layer 40 is an electrically non-conducting layer, having a thickness of at least 5 to 10 nm (typically 10 nm to 100 nm) it would be expected that electrons used in the electrochemical deposition cannot pass through this layer and that an electro-precipitation reaction would not be possible at the dielectric/liquid interface.

Without being bound by theory, the mechanism of the electrochemical deposition of a Ni(OH)$_2$ layer on a nanoporous dielectric layer (corresponding to solid electrolyte layer 40 in a device of the present disclosure) with an underlying electrically conductive layer (corresponding to a negative current collector layer 12 in a device of the present disclosure) may be explained by an electrochemical reduction of nitrates ($NO_3^- + H_2O + 2e^- \rightarrow NO_2^- + 2OH^-$) at the electrically conductive layer, leading to an increase of pH not only at the electrically conductive surface of that layer but also at the surface of the nanoporous dielectric layer on top of it, due to liberated OH$^-$ and OH$^-$ conduction through the nanoporous dielectric layer; and a chemical reaction of Ni$^{2+}$ with OH$^-$ leading to precipitation of Ni(OH)2 on the porous dielectric layer surface: $Ni^{2+} + 2OH^- \rightarrow NiO.H_2O\downarrow$.

Thus, without being bound by theory, the mechanism of the electrochemical deposition by electro-precipitation of a Ni(OH)$_2$ layer 50 on a nanoporous dielectric layer may be explained through the assumption that the pH change needed for the electro-precipitation reaction also occurs at the porous dielectric layer that conducts ions but not electrons. It is assumed that the pH change builds up inside the pores and eventually in a surface layer at the interface between the dielectric layer and the solution, where electro-precipitation occurs. NO$_3^-$ ions may diffuse from the electrolyte solution through the pores of the nanoporous dielectric layer towards the underlying electrically conductive current collector layer. At the current collector they may be reduced to NO$_2^-$ ($NO_3^- + H_2O + 2e^- \rightarrow NO_2^- + 2OH^-$). This may be followed by an outward diffusion (i.e. from the current collector through the nanoporous dielectric layer towards the exposed dielectric layer surface which is in contact with the electrolyte bath) of the generated OH$^-$ ions. A chemical reaction of Ni$_2^+$ with OH$^-$ at the exposed surface of the nanoporous dielectric layer may then result in the precipitation of Ni(OH)$_2$ on the dielectric layer surface ($Ni^{2+} + 2OH^- \rightarrow NiO.H_2O\downarrow$).

In embodiments of the present disclosure, the precipitation reaction may occur after electrochemical charging of the active electrode material, e.g. titania, present in the nanoporous composite negative electrode layer 30 underneath the porous dielectric layer 40. In fact, the initial charging of the titania-silica composite layer according to reaction (4) has to be taken into account in the calculation or calibration of the total charge used for electrochemical deposition of Ni(OH)$_2$. It was found that the electrochemical deposition of Ni(OH)$_2$ on the nanoporous dielectric layer 40 according to embodiments of the present disclosure occurs in two steps or two phases. In a first step or first phase of the electrochemical process, the nanoporous composite negative electrode layer 30 is charged. As a result of this initial charging step, it becomes an electronic conductor and the actual Ni(OH)$_2$ material deposition starts (second step or second phase of the electrochemical deposition process).

Experiment 1: Electro-Precipitation of Ni(OH)$_2$ on Ni

Figure 4:
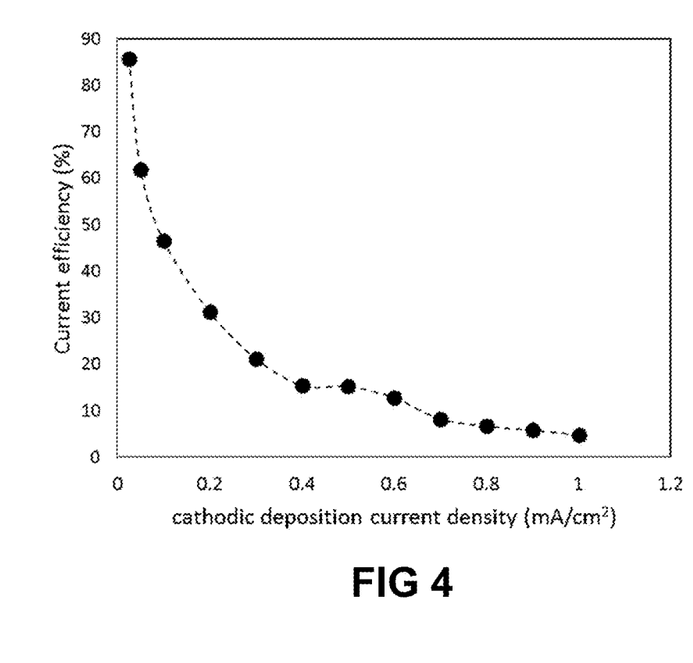
FIG. 4 illustrates an example of a measured current efficiency as a function of the cathodic deposition current density for an Ni(OH)$_2$ layer galvanostatically deposited on TiN/Ni, according to example embodiments.
Figure 5:
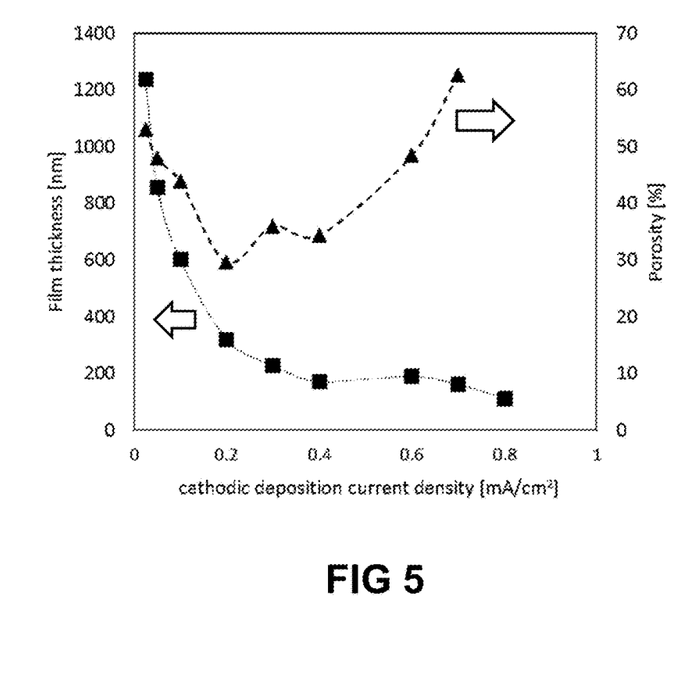
FIG. 5 illustrates an example of a measured film thickness (filled squares) and the measured porosity (filled triangles) as a function of the cathodic deposition current density for an Ni(OH)$_2$ layer galvanostatically deposited on TiN/Ni, according to example embodiments.

Experiments were done wherein a Ni(OH)$_2$ layer was formed by galvanostatic deposition on a TiN/Ni layer stack using a 0.01M Ni(NO$_3$)$_2$ solution with a total charge Q=−0.26 C/cm$^2$. FIG. 4 shows the measured current efficiency as a function of the cathodic deposition current density as calculated from the nickel content of the deposited layer, as determined by using RBS (Rutherford Backscatter Spectrometry). FIG. 5 shows the corresponding film thickness as determined by SEM (filled squares) and the calculated porosity (filled triangles) as a function of the cathodic deposition current density.

Figure 6:
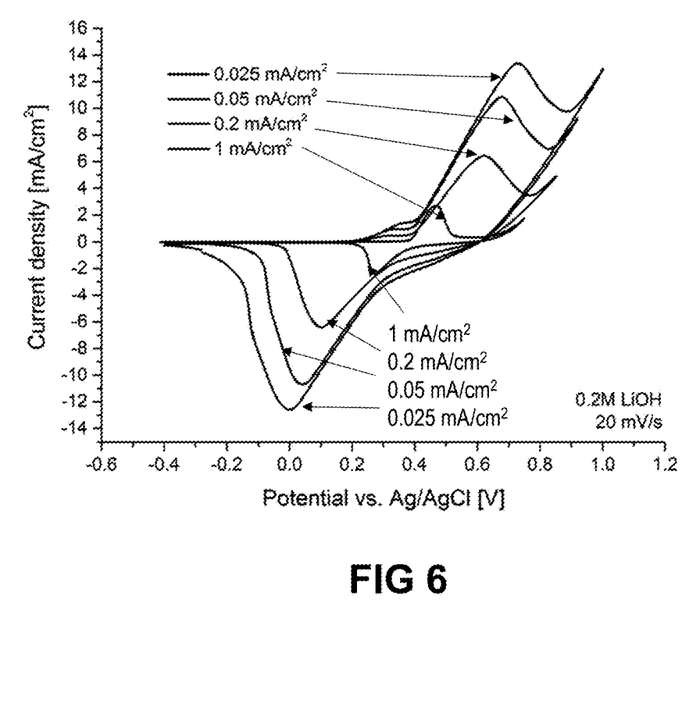
FIG. 6 illustrates results of cyclic voltammetry measurements performed in 0.2M LiOH at a scan rate of 20 mV/s for a galvanostatically deposited Ni(OH)$_2$ layer, according to example embodiments.
Figure 7:
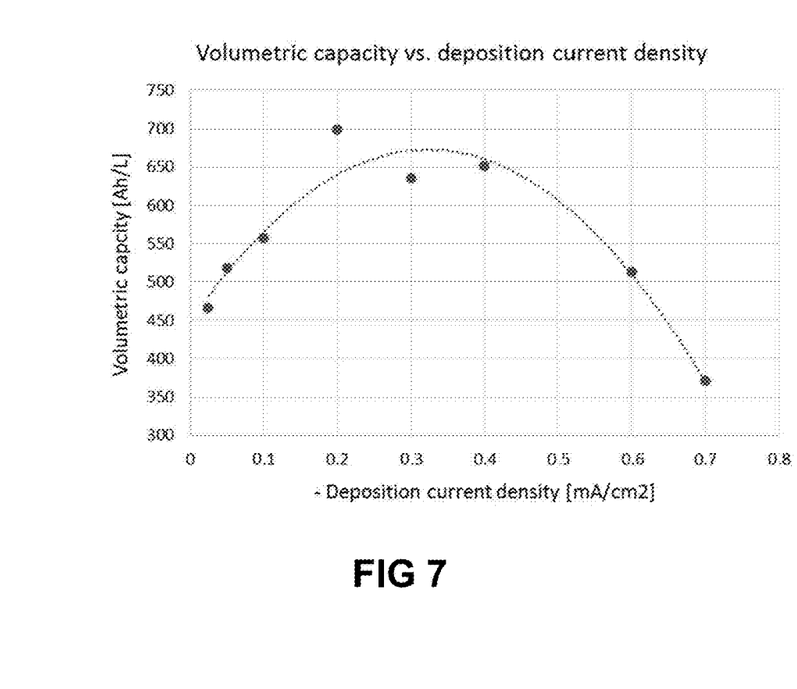
FIG. 7 illustrates a volumetric capacity as a function of deposition current density as determined from cyclic voltammetry measurements at a scan rate of 20 mV/s for Ni(OH)$_2$ layers fabricated by electrodeposition in a 0.01M Ni(NO$_3$)$_2$ solution, according to example embodiments.

It was shown that the amount of deposited Ni(OH)$_2$ (n(Ni), unit: mole/cm$^2$) and thus the storage capacity of the electrode is determined by the current density (i, unit: A/cm$^2$) and by the deposition time (t, unit: s), according to:

$$n(Ni) = \frac{i \cdot t}{z \cdot F} \cdot \frac{\eta(i)}{100\%}$$

wherein F is 96485 C/mol (Faraday's constant), z=2 (corresponding to the number of electrons exchanged for 2OH$^-$ ions by reduction of NO$_3^-$) and η(i) is the current efficiency or deposition efficiency in %. The current efficiency shown in FIG. 4 was calculated according to this formula. The amount of Ni measured by RBS was found to correspond very well with the amount of deposited Ni(OH)$_2$ as determined from the electrode capacity, which was determined from cyclic voltammetry measurements (potential versus Ag/AgCl) in 0.2M LiOH at a scan rate of 20 mV/s, as shown in FIG. 6. These curves illustrate the activity of the Ni(OH)$_2$ layer as a positive electrode according to reaction (5). The positive or anodic peak of the voltammogram corresponds to the electrode reaction for oxidation of Ni(OH)$_2$ to NiOOH. The negative or cathodic peak of the voltammogram shows the reverse reaction for NiOOH reduction to Ni(OH)$_2$. The charges under the anodic and cathodic peaks were found to be substantially equal, showing reversibility. The charge integrated in the peaks equals the charge of the Ni(OH)$_2$ layer according to reaction (5). The charge integrated under the peaks is related to the volumetric capacity of the Ni(OH)$_2$ layers. The volumetric capacity calculated for some of the Ni(OH)$_2$ layers is shown in FIG. 7 as a function of deposition current density. A theoretical capacity of 990 Ah/l was calculated based on the amount of Ni measured by RBS (and assuming a dense, non-porous layer). As the Ni(OH)$_2$ layers are porous, the actual volume is higher and the actual volumetric capacity (shown in FIG. 7) is lower than for a dens layer. In FIG. 7 the capacity is normalized to the actual layer thickness as measured by SEM.

It was found that the film porosity (in %) is a function of the current density (which is related to n(Ni)) and can be determined from the measured film thickness (d, unit: cm) according to:

$$\text{porosity} = 100\% \cdot \left(1 - \frac{n(\text{Ni}) \cdot MW}{d \cdot \rho}\right)$$

wherein MW=110.72 g/mol as the molecular weight for $Ni(OH)_2.H_2O$ and ρ=4.1 g/cm3 as the density of $Ni(OH)_2.H_2O$.

Experiment 2: Electro-Precipitation of $Ni(OH)_2$ on Nanoporous Titania-Silica

Experiments were done wherein a $Ni(OH)_2$ layer was formed in accordance with embodiments of the present disclosure, by galvanostatic deposition on a nanoporous titania-silica layer (corresponding to a negative electrode layer 30 in a device according to an embodiment of the present disclosure). A cleaned n-type silicon substrate 11 coated with a Ti (15 nm)/TiN (150 nm) layer stack (first current collector layer 12) was used, with a 500 nm or 800 nm thick nanoporous titania-silica composite negative electrode layer 30 on top of the TiN layer. The nanoporous titania-silica layers were formed by spin coating a precursor solution and baking. For forming the 500 nm thick nanoporous titania-silica layers two subsequent coating steps were used and for forming the 800 nm thick nanoporous titania-silica layers three subsequent coating steps were used. In the galvanostatic deposition process, two different deposition current densities were used. In one experiment a deposition current density of $-0.05$ A/cm$^2$ was used, resulting in a $Ni(OH)_2$ layer having a porosity of about 50%. In another experiment a deposition current density of $-0.2$ mA/cm$^2$ was used, resulting in a denser $Ni(OH)_2$ layer having a porosity of about 30%. $Ni(OH)_2$ layers with thicknesses between 200 nm and 2.5 micrometer were deposited successfully. The thickness was controlled by selecting a suitable deposition time and current density as described above. In some of the experiments, deposition of $Ni(OH)_2$ layers 50 was obtained directly on the titania-silica composite electrode layer 30. Additional experiments were performed wherein successful deposition of $Ni(OH)_2$ layers 50 was obtained on porous dielectric layers (being provided on top of the titania-silica composite layer 30) acting as an electrolyte layer 40, wherein the porous dielectric layer 40 consisted either of a 10 nm thick PVD silicon oxide layer, a 10 nm thick PECVD silicon nitride layer or a 10 nm to 30 nm thick spin-coated nanoporous silica layer obtained from a silicon/xylene precursor mixture.

Figure 8:
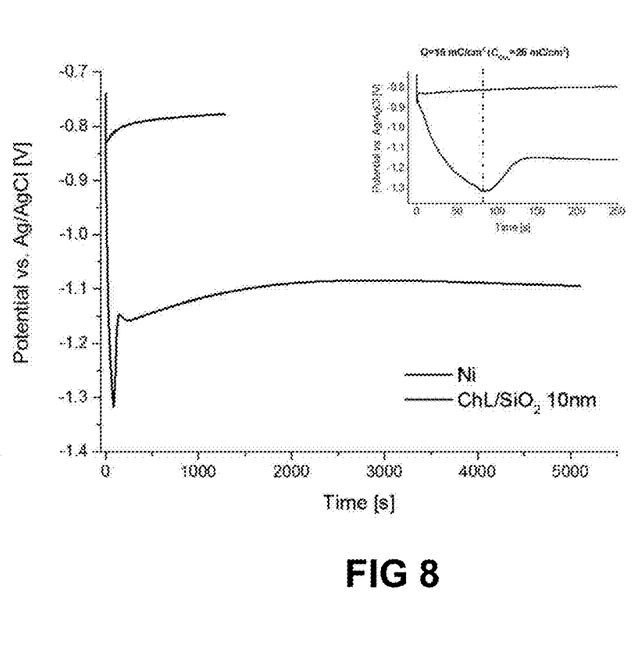
FIG. 8 illustrates a potential versus Ag/AgCl as a function of time as measured during electrochemical deposition of a Ni(OH)$_2$ layer on a Ni layer (upper curve) and on a 10 nm thick porous silica layer provided on top of a nanoporous composite negative electrode layer (lower curve), according to example embodiments.

As an example, results are shown below for a $Ni(OH)_2$ layer that was galvanostatically deposited in accordance with an embodiment of the present disclosure on a substrate comprising a Ti (15 nm)/TiN (150 nm) layer stack (current collector layer) on a cleaned n-type silicon substrate, a 750 nm thick nanoporous titania-silica composite negative electrode layer 30 (formed by three subsequent spin-coating and baking steps) on top of the TiN layer and a 10 nm PVD silicon oxide layer 40 on the negative electrode layer 30. In the galvanostatic deposition process, a 0.01M $Ni(NO_3)_2$ solution was used and a deposition current density of $-0.2$ A/cm$^2$ (total charge=$-1.04$ C/cm$^2$). The thickness of the $Ni(OH)_2$ layer was about 1.2 micrometer. FIG. 8 shows the potential versus Ag/AgCl as a function of time as measured during the electrochemical deposition of the $Ni(OH)_2$ layer (upper curve). For comparison, the potential during deposition on an electronically conducting Ni substrate (experiment performed at a current density of $-0.2$ mA/cm$^2$, total charge=$-0.26$ C/cm$^2$ and also reported in FIG. 4 and FIG. 5) is also shown in FIG. 8. The potential versus Ag/AgCl for electrodeposition on the layer stack comprising the nanoporous electrode layer and the nanoporous silicon oxide layer is shifted to more negative values due to the additional resistance of the nanoporous dielectric stack as compared to the deposition on Ni. Furthermore, the deposition on the layer stack comprising the nanoporous electrode layer and the nanoporous silicon oxide layer shows an initial drop of the potential versus Ag/AgCl. This is related to charging of the negative electrode layer 30, before the actual $Ni(OH)^2$ deposition starts, as described above. The inset of FIG. 8 shows that 16 mC/cm$^2$ is reached at the peak and about 25 mC/cm$^2$ when the plateau is reached. This charge is used for charging of the $TiO_x$ in the composite negative electrode layer 30 according to reaction (4), and accounts to about 35% of the total capacity of the composite electrode. This clearly shows that, when estimating the charge used for deposition of the $Ni(OH)_2$ layer in embodiments of the present disclosure, this additional charge used for charging of the composite negative electrode layer 30 should be taken into account.

The present disclosure further provides a method for fabricating a battery cell 100 having a layer stack as schematically illustrated in FIG. 1 and as described above. The method comprises: providing on a carrier substrate 11 a negative current collector layer 12 (or providing a substrate 10 comprising a negative current collector layer 12 or having the function of a negative current collector layer); optionally providing an electron injection layer 20 on the negative current collector layer 12; providing a negative electrode layer 30 (first electrode layer), wherein the negative electrode layer is a nanoporous composite layer, on the negative current collector layer 12 or on the electron injection layer 20 if present; providing a solid electrolyte layer 40, wherein the solid electrolyte layer is a porous dielectric layer, on the negative electrode layer 30; and providing using an electrochemical deposition process, e.g. an electro-precipitation process, a positive electrode layer 50 (second electrode layer), wherein the positive electrode layer is a $Ni(OH)_2$ layer, on the porous dielectric layer 40. The method further comprises depositing a positive current collector layer 60 (second current collector layer) on the $Ni(OH)_2$ positive electrode layer 50.

The nanoporous composite negative electrode layer 30 comprises a mixture of a dielectric material and an active electrode material, e.g. active electrode material nanoparticles. It may for example be a titania-silica composite layer. In embodiments of the present disclosure the nanoporous composite negative electrode layer 30 may comprise a mixture of dielectric material nanoparticles, e.g. silica, alumina or zirconia nanoparticles, and active material nanoparticles, e.g. titania nanoparticles or oxide nanoparticles containing e.g. Ta, Sn, Zn, Cu, Ge, W, Mo, V or Nb, the present disclosure not being limited thereto. Such composite layer may for example be formed using solution processing, such as casting, blade coating, spray coating or printing of a precursor mixture on a substrate and baking. The mixture may for example be a nanoparticle composite slurry or ink, e.g. a mix of nanoparticles suspended in a solvent. In other embodiments of the present disclosure the nanoporous composite negative electrode layer 30 may comprise a dielectric material matrix, e.g. silica matrix, with an active electrode material, e.g. active electrode material particles, e.g. titania particles, dispersed therein. Such composite layer may for example be formed by chemical solution deposition (CSD). It may for example be formed by a sol-gel method wherein silica and titania are formed from chemical precursor molecules such as e.g. a Ti(IV)-organic acid complex for titania and TEOS or silicone for silica. Also a combination of both can be used, e.g. titania nanoparticles suspended in a sol-gel mixture for porous silica.

In some embodiments, after the deposition of the negative electrode layer 30, an activation step is performed, such as an UV curing step, to activate the layer, i.e. to make the layer hydrophilic (e.g. by removal of hydrophobic groups such as methyl groups). In the experiments UV curing was done using an UVC spectrum having a sharp peak at 254 nm, at an irradiance of 70 mW/cm$^2$ for 2 hours. However, the present disclosure is not limited thereto and other suitable UV irradiation parameters may be used. As an alternative for UV curing, or in addition to UV curing, the activation may comprise annealing in a humid ambient (e.g. an ambient containing water or water vapor), such as for example annealing at a temperature in the range between 400° C. and 550° C., for 1 to 3 hours, in an environment comprising $H_2$ and $O_2$, the present disclosure not being limited thereto. For example, in experiments a humidity anneal was performed by baking the wafers in a furnace at 500° C. for 2 hours with a flow of 5 slm $H_2$ and a 3.75 slm $O_2$. The UV irradiation step or humidity anneal step may be done directly after deposition of the negative electrode layer 30. Alternatively or in addition thereto, it may be done after formation of an electrolyte layer 40 on top of the negative electrode layer 30, i.e. simultaneously for the negative electrode layer 30 and the electrolyte layer 40.

For the porous solid electrolyte layer 40, any dielectric material that is stable under the conditions of operation and that is sufficiently hydrophilic for a surface water layer to form on the pore walls can be used (i.e. allowing the formation at least a continuous monolayer of water). Examples of materials that may be used are silicon oxides, e.g. thin silicon oxides formed by CVD or PVD, or thin oxides formed by solution processing such as spin-on deposition or by a sol-gel method (thickness 10 nm-100 nm) and nitrides (thickness 5 nm to 10 nm). For example, thin porous oxides may be formed by spin coating a precursor comprising a silicone/xylene mixture and baking. The deposition method and conditions should be selected such that the oxide does not fill or plug the underlying nanoporous electrode layer 30. Examples of suitable methods are sol-gel processing, PVD and CVD. The pore size of the porous dielectric layer 40 may for example be in the range between 1 nm and 20 nm, such as for example in the order of 10 nm, the present disclosure not being limited thereto. The porosity may for example be in the range between 10% and 90%, e.g. between 20% and 60%, for example between 30% and 40%.

For example, in experiments a porous oxide layer 40 was deposited on a nanoporous silica-titania layer by spin coating and baking. A sol-gel precursor solution for forming the porous oxide layer 40 was prepared by mixing 23.0 ml of xylene with 7.0 ml of silicone oil. This was done in an Ar glovebox. Mixing was obtained by slowly shaking the solution for 10 minutes using a shaking machine. Using a pipette, 3 ml of the precursor solution was dropped on an 8-inch substrate and then spin-coated at 1000 rpm. This was followed by a drying step at 80° C. for 10 minutes and a pre-bake step at 350° C. for 10 minutes on a hot plate in air. Next a hard bake step was done in a furnace at 500° C. for 2 hours in an atmosphere comprising 79% $N_2$ and 21% $O_2$.

In embodiments of the present disclosure, the positive electrode layer 50 is an electro-precipitated Ni(OH)$_2$ layer. For the electrolyte bath for Ni(OH)$_2$ deposition, different electrolyte solutions may be used. There is a need for an Ni$^{2+}$ source. The Ni$^+$ concentration may be for example in the range between 1 mM and 1 M. Within this range, a low concentration may be used, such as, for example, a concentration in the order of 0.01 M. It was observed experimentally that a lower concentration within this range provides smoother and more uniform depositions. It also allows preventing Ni plating and deposition inside the pores of the underlying porous layer. As an anion, $NO_3^-$ may be used, but any anion that is indifferent in the reaction and that does not dissolve the Ni(OH)$_2$ deposit can be used. Examples are $SO_4^{2-}$ and $CH_3COO^-$, the present disclosure not being limited thereto. Further, there is a need for an oxidizing agent. In some embodiments, this may be $NO_3^-$ based (coming with the Ni(NO$_3$)$_2$ electrolyte or with an indifferent cation such as K$^+$, Na$^+$, Li$^+$), but it works with any oxidizing agent that introduces a pH rise upon electro-reduction, such as for example water (which may result in the formation of hydrogen which can cause pinholes), $O_2$ (intrinsic in the solution or added by purging) or $H_2O_2$ (which may be unstable). The method may be performed with or without a supporting or indifferent electrolyte, such as for example $Na_2SO_4$.

The positive current collector layer 60 may for example be deposited using PVD (Physical Vapor Deposition). It may for example comprise Ni, W, Ti or a combination thereof, the present disclosure not being limited thereto.

Experiment 3: Fabrication of Battery Cells

Battery cells 100 were fabricated in accordance with an embodiment of a method of the present disclosure. On an 8-inch silicon carrier substrate 11 a metal layer stack 12 consisting of a 15 nm thick Ti layer and a 150 nm thick TiN layer was deposited. This metal layer stack forms the negative collector layer 12 (and is considered part of the substrate 10). On the TiN layer a 750 nm thick negative titania-silica composite electrode layer 30 was formed by spin coating a precursor solution and baking. A precursor solution for the negative electrode layer was prepared in an Ar glovebox by mixing 25 ml of Tetraheptanoic Acid Titanium (IV) salt with 45.9 ml of xylene (solvent) and 6.25 ml of silicone oil (chemical precursor). First the xylene was poured into the Tetraheptanoic Acid Titanium (IV) Salt and next the silicone oil was added to this solution. Mixing was obtained by slowly shaking the solution for 10 minutes using a shaking machine. Using a pipette, 3 ml of the precursor solution was dropped on the 8-inch substrate and then spin-coated at 1000 rpm. This was followed by a drying step at 80° C. for 10 minutes and a pre-bake step at 350° C. for 10 minutes on a hot plate in air. This step sequence of spin-coating, drying and pre-baking was performed two or three times, depending on the layer thickness. A single coating and baking step resulted in a layer thickness of about 250 nm. Afterwards a hard bake step was done in a furnace at 500° C. for 2 hours in an atmosphere comprising 79% $N_2$ and 21% $O_2$. An UV curing step was then carried out. This was done in a high-power UVC irradiation chamber using an UVC spectrum having a sharp peak at 254 nm, at an irradiance of 70 mW/cm$^2$ for 2 hours. A humidity anneal was then performed by baking the wafers in a furnace at 500° C. for 2 hours with a flow of 5 slm $H_2$ and a 3.75 slm $O_2$.

On top of the negative electrode layer 30 a 10 nm thick silicon oxide layer 40 was deposited using plasma sputtering. The porosity of this layer was estimated to be in the range 10%-30%. Next the sample was cleaned with IPA and dried with a nitrogen gun.

A 200 nm thick Ni(OH)$_2$ layer (positive electrode layer 50) was then deposited electrochemically on the silicon oxide layer. In the galvanostatic deposition process, a 0.01M Ni(NO$_3$)$_2$ solution was used, with a platinum counter electrode and an Ag/AgCl reference electrode. The deposition current density was −0.05 A/cm$^2$. The total charge Q was −0.115 C/cm$^2$. When estimating the total charge for the galvanostatic deposition of the Ni(OH)$_2$ layer, the initial charging of the titania-silica composite electrode layer 30 according to reaction (4) was taken into account. It was found that, for this particular example, a charge of −0.065 C/cm$^2$ was used for the initial charging (first phase of the electrochemical process) and a charge of −0.050 C/cm$^2$ for the actual Ni(OH)$_2$ deposition (second phase of the electrochemical process), resulting in a total charge of −0.115 C/cm$^2$.

Figure 9:
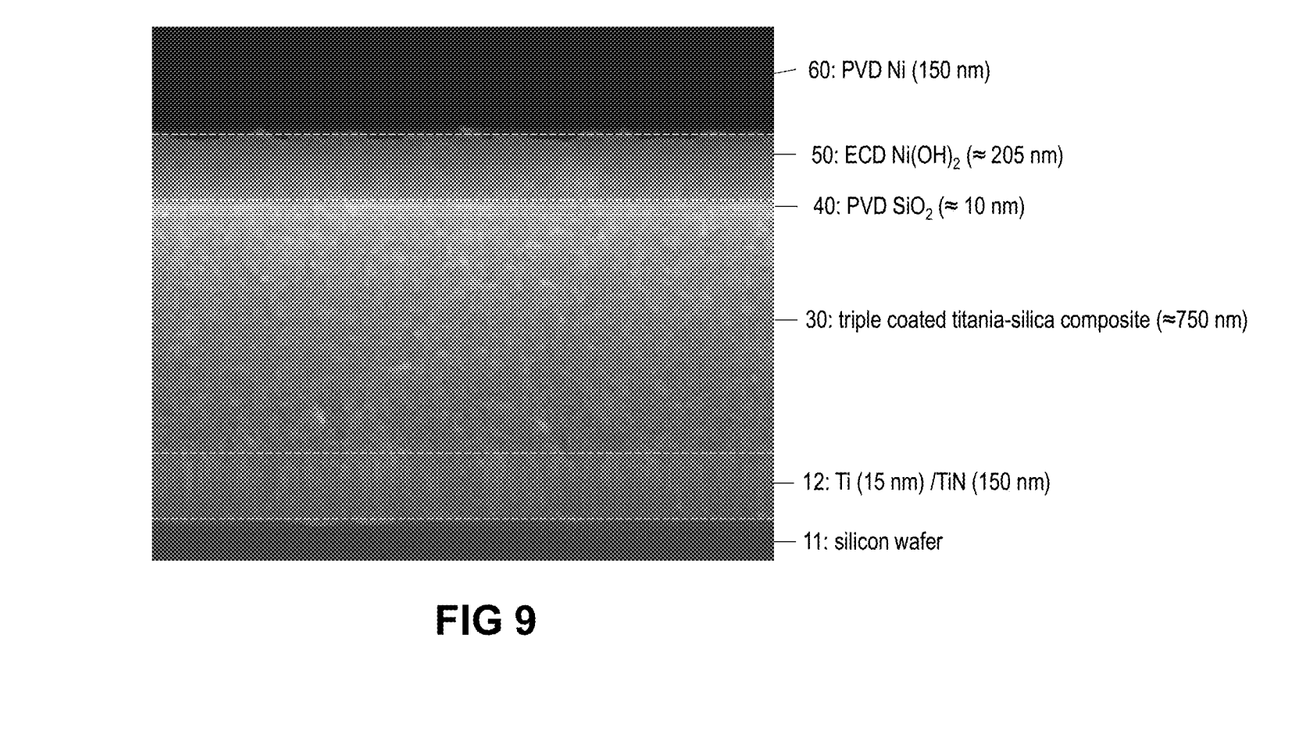
FIG. 9 illustrates a SEM (Scanning Electron Microscope) picture of a battery fabricated according to example embodiments.

Next a 150 nm thick Ni layer (positive current collector layer 60) was deposited on the Ni(OH)$_2$ positive electrode layer 50 by plasma sputtering. FIG. 9 shows a SEM picture of the resulting layer stack.

Figure 10:
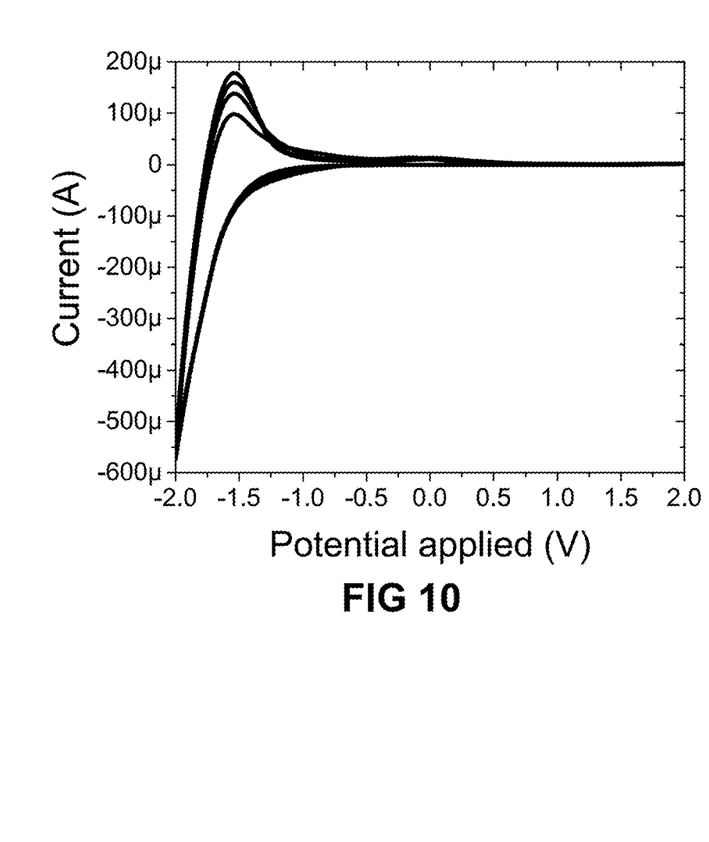
FIG. 10 illustrates cyclic voltammetry curves measured for a battery fabricated according to example embodiments.

As illustrated in FIG. 10, cyclic voltammetry measurements performed on this device show clear discharge peaks, indicating that the device is electrochemically active.

Figure 11:
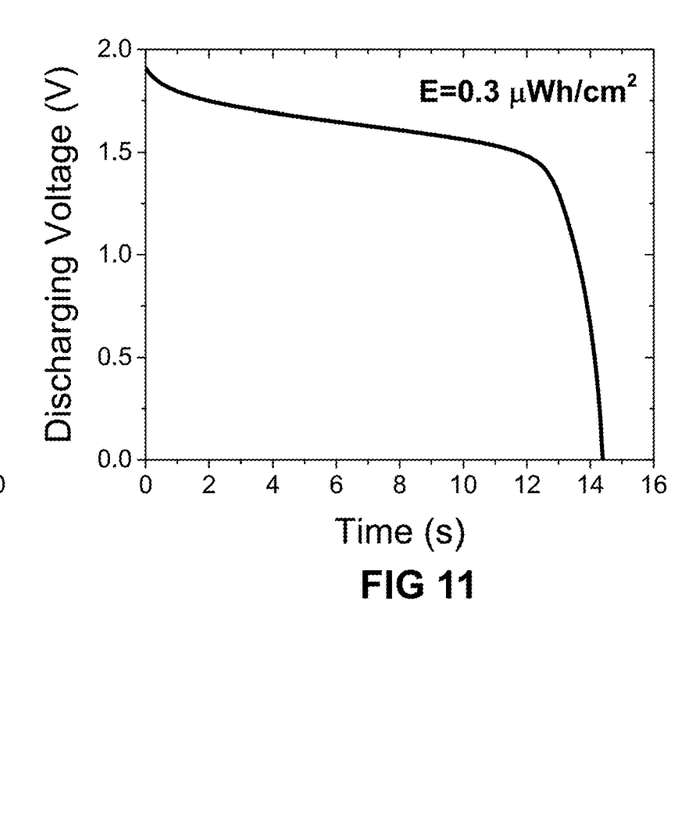
FIG. 11 illustrates the measured discharging voltage as a function of time for a battery fabricated according to example embodiments.

FIG. 11 shows the measured discharging voltage as a function of time for this battery. The battery was first charged for 5 minutes at 2 V. The battery was then discharged at a current density j=−50 micro·A/cm$^2$ till a battery voltage of 0 V was reached (at time t=t$_{cut-off}$). The measured battery voltage (discharging voltage U) is shown as a function of time in FIG. 11. From this voltage profile the energy E was calculated as $$E = \int_0^{t_{cut-off}} j \cdot U(t) \cdot dt,$$

resulting in an energy density E of 0.3 micro·Wh/cm$^2$.

The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

It is to be understood that although example embodiments, specific constructions and configurations, as well as materials, have been discussed herein for devices according to the present disclosure, various changes or modifications in form and detail may be made without departing from the scope and spirit of this disclosure. For example, steps may be added or deleted to methods described within the scope of the present disclosure.

Whereas the above detailed description as well as the summary of the disclosure has been focused on a method for fabricating a device, the present disclosure also relates to a device obtained using a method according to any of the embodiments as described above.

What is claimed is:

1. A method for fabricating a thin-film solid-state battery cell on a substrate comprising a first current collector layer, the method comprising:
   depositing above the first current collector layer a first electrode layer,
   wherein the first electrode layer is a nanoporous composite layer comprising a plurality of pores having pore walls, and
   wherein the first electrode layer comprises a mixture of a dielectric material and an active electrode material;
   depositing above the first electrode layer a porous dielectric layer; and
   depositing directly on the porous dielectric layer a second electrode layer,
   wherein depositing the second electrode layer comprises depositing a porous Ni(OH)$_2$ layer using an electrochemical deposition process.

2. The method for fabricating a thin-film solid-state battery cell according to claim 1, further comprising hydrophilizing the pore walls of the nanoporous composite layer.

3. The method for fabricating a thin-film solid-state battery cell according to claim 2, wherein hydrophilizing the pore walls of the nanoporous composite layer comprises performing an ultraviolet (UV) curing step.

4. The method for fabricating a thin-film solid-state battery cell according to claim 2, wherein hydrophilizing the pore walls of the nanoporous composite layer comprises performing an annealing step in a humid atmosphere.

5. The method for fabricating a thin-film solid-state battery cell according to claim 1, wherein the electrochemical deposition process is an electro-precipitation process.

6. The method for fabricating a thin-film solid-state battery cell according to claim 1, wherein the electrochemical deposition process comprises:
   a first phase comprising charging of the first electrode layer, thereby making the first electrode layer electrically conductive; and
   a second phase comprising Ni(OH)$_2$ material precipitation on the porous dielectric layer.

7. The method for fabricating a thin-film solid-state battery cell according to claim 1, further comprising depositing a second current collector layer above the second electrode layer.

8. A thin-film solid-state battery cell comprising:
   a first current collector layer;
   a first electrode layer above the first current collector layer,
   wherein the first electrode layer is a nanoporous composite layer comprising a plurality of pores having pore walls, and
   wherein the first electrode layer comprises a mixture of a dielectric material and an active electrode material;
   a porous dielectric layer above the first electrode layer; and
   a second electrode layer directly on the porous dielectric layer,
   wherein the second electrode layer is a thin-film, porous Ni(OH)$_2$ layer.

9. The thin-film solid-state battery cell according to claim 8, wherein a thickness of the thin-film, porous Ni(OH)$_2$ layer is between 100 nm and 10 micrometers.

10. The thin-film solid-state battery cell according to claim 8, wherein the thin-film, porous Ni(OH)$_2$ layer has a porosity between 40% and 60%.

11. The thin-film solid-state battery cell according to claim 8, wherein the first electrode layer is a silica-titania, nanoporous layer with a porosity between 20% and 60%.

12. The thin-film solid-state battery cell according to claim 8, wherein the porous dielectric layer is a porous silica layer having a porosity between 10% and 90%.

13. The thin-film solid-state battery cell according to claim 8, wherein the mixture of the dielectric material and the active electrode material comprises a dielectric material matrix with active electrode material nanoparticles dispersed therein.

14. The thin-film solid-state battery cell according to claim 8, wherein the mixture of the dielectric material and the active electrode material is a mixture of dielectric material nanoparticles and active electrode material nanoparticles.

15. A thin-film solid-state battery comprising two thin-film solid-state battery cells,
wherein the two thin-film solid-state battery cells are electrically coupled via a series or parallel connection, and
wherein each thin-film solid-state battery cell comprises:
a first current collector layer;
a first electrode layer above the first current collector layer,
wherein the first electrode layer is a nanoporous composite layer comprising a plurality of pores having pore walls, and
wherein the first electrode layer comprises a mixture of a dielectric material and an active electrode material;
a porous dielectric layer above the first electrode layer; and
a second electrode layer directly on the porous dielectric layer,
wherein the second electrode layer is a thin-film, porous $Ni(OH)_2$ layer.

16. The thin-film solid-state battery according to claim 15, wherein a thickness of the thin-film, porous $Ni(OH)_2$ layer is between 100 nm and 10 micrometers.

17. The thin-film solid-state battery according to claim 15, wherein the thin-film, porous $Ni(OH)_2$ layer has a porosity between 40% and 60%.

18. The thin-film solid-state battery according to claim 15, wherein the first electrode layer is a silica-titania, nanoporous layer with a porosity between 20% and 60%.

19. The thin-film solid-state battery according to claim 15, wherein the porous dielectric layer is a porous silica layer having a porosity between 10% and 90%.

20. The thin-film solid-state battery according to claim 15, wherein the mixture of the dielectric material and the active electrode material comprises a dielectric material matrix with active electrode material nanoparticles dispersed therein.

* * * * *